(12) United States Patent
Accessor

(10) Patent No.: US 10,916,038 B2
(45) Date of Patent: Feb. 9, 2021

(54) MODULATING VEHICLE PAINT VIA DATA ANALYTICS

(71) Applicant: Toyota Motor North America, Inc., Plano, TX (US)

(72) Inventor: Walter Accessor, Little Elm, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 72 days.

(21) Appl. No.: 16/163,457

(22) Filed: Oct. 17, 2018

(65) Prior Publication Data

US 2020/0126259 A1    Apr. 23, 2020

(51) Int. Cl.
| | | |
|---|---|---|
| G06T 7/90 | (2017.01) | |
| B05B 12/00 | (2018.01) | |
| G06F 16/29 | (2019.01) | |

(52) U.S. Cl.
CPC ............... *G06T 7/90* (2017.01); *B05B 12/00* (2013.01); *G06F 16/29* (2019.01); *G06T 2207/10024* (2013.01); *G06T 2207/30156* (2013.01)

(58) Field of Classification Search
CPC ................ B05B 12/00; G06F 16/29; G06T 2207/10024; G06T 2207/30156; G06T 7/90

See application file for complete search history.

(56) References Cited

U.S. PATENT DOCUMENTS

| | | |
|---|---|---|
| 5,142,648 A | 8/1992 | Fitts et al. |
| 6,522,977 B2 | 2/2003 | Corrigan et al. |
| 6,528,109 B1 | 3/2003 | Filev et al. |
| 6,717,584 B2 | 4/2004 | Kulczycka |
| 8,782,026 B2 | 7/2014 | Poland et al. |
| 9,509,960 B2 | 11/2016 | Mirza et al. |
| 9,773,251 B2 | 9/2017 | Liu et al. |
| 2006/0228806 A1 | 10/2006 | Sens et al. |
| 2017/0050561 A1* | 2/2017 | Lickfelt ............... H04N 5/2256 |
| 2018/0065453 A1 | 3/2018 | Gaddis et al. |

(Continued)

FOREIGN PATENT DOCUMENTS

| | | | |
|---|---|---|---|
| WO | WO2016081787 | 5/2016 | |
| WO | WO2017142536 | 8/2017 | |
| WO | WO-2017142536 A1 * | 8/2017 | ........... G08G 1/0112 |

OTHER PUBLICATIONS

Gursch et al.; "Parameter Forecasting for Vehicle Paint Quality Optimization"; 5 pages; 2016.

(Continued)

*Primary Examiner* — Alexander M Weddle
(74) *Attorney, Agent, or Firm* — Snell & Wilmer LLP

(57) ABSTRACT

Methods and systems for improving vehicle paint of a vehicle in a particular geographic region. The system includes a paint sensor located on an exterior of the vehicle and configured to detect paint data of the vehicle. The system also includes an ambient light sensor configured to detect ambient light data when the paint sensor detects the paint data. The system also includes a vehicle transceiver configured to communicate the paint data and the ambient light data. The system also includes a remote data server configured to receive the paint data and the ambient light data from the vehicle and determine an improved paint formulation or an improved painting process based on the paint data and the ambient light data.

13 Claims, 6 Drawing Sheets

(56) References Cited

U.S. PATENT DOCUMENTS

2019/0152383 A1* 5/2019 Kumar .................. G01D 7/005

OTHER PUBLICATIONS

"Automotive Paint Defect Analysis"; 1 page; Oct. 10, 2017.
"Test Program of Durability of Aircraft Coatings"; 34 pages; Jun. 20, 1967.
Bayer et al. "Failure Analysis of Paints and Coatings" 37 pages; Aug. 3, 2004.

* cited by examiner

MODULATING VEHICLE PAINT VIA DATA ANALYTICS

BACKGROUND

1. Field

This specification relates to a system and a method for improving vehicle paint of a vehicle in a particular geographic region.

2. Description of the Related Art

Vehicles, such as automobiles, may be coated with a paint. The paint may be colored and may include various chemicals and ingredients to increase durability and/or to increase the aesthetic appeal of the vehicle. Like other parts of the vehicle, the paint experiences wear and tear due to various factors. For example, adverse weather conditions, accidents, and general usage contribute to degradation of the paint. While weather and climate conditions may vary by geographic region, the paint used on all vehicles of a particular make and model remains the same regardless of the geographic region the vehicle is delivered to.

By keeping the paint used on all vehicles of a particular make and model the same, the paint of the vehicle is susceptible to wear and tear that is unique to the vehicle's geographic region. Improving a vehicle's paint composition improves not only the aesthetic appearance of the vehicle, but also the integrity of the vehicle and the structural components thereof.

SUMMARY

What is described is a system for improving vehicle paint of a vehicle in a particular geographic region. The system includes a paint sensor located on an exterior of the vehicle and configured to detect paint data of the vehicle. The system also includes an ambient light sensor configured to detect ambient light data when the paint sensor detects the paint data. The system also includes a vehicle transceiver configured to communicate the paint data and the ambient light data. The system also includes a remote data server configured to receive the paint data and the ambient light data from the vehicle and determine an improved and optimized painting process (e.g., formulation and steps of painting) based on a learning algorithm that analyzes the paint data and the ambient light data sent by vehicles on different geographic regions. The system also includes inputs from environmental sensors that are sent to the remote data server for cloud computing.

Also described is a method for improving vehicle paint of a vehicle in a particular geographic region. The method includes detecting, by a paint sensor located on an exterior of the vehicle, paint data of the vehicle. The method also includes detecting, by an ambient light sensor, ambient light data when the paint sensor detects the paint data. The method also includes communicating, by a vehicle transceiver to a remote data server, the paint data and the ambient light data. The method also includes determining, by a remote data server, an improved paint formulation based on the paint data and the ambient light data. The method also includes a learning algorithm performed by the remote data server that receives inputs (e.g., paint data, ambient light data, geographic region data, vehicle data) and determines how to optimize and/or alter the painting process.

Also described is a vehicle located in a particular geographic region. The vehicle includes a paint sensor located on an exterior of the vehicle and configured to detect paint data. The vehicle also includes an ambient light sensor configured to detect ambient light data when the paint sensor detects the paint data. The vehicle also includes a transceiver configured to communicate the paint data and the ambient light data to a remote data server configured to determine an improved paint formulation based on the paint data and the ambient light data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for improving vehicle paint of a vehicle in a particular geographic region. Conventionally, vehicles are painted using the same paint formulation regardless of where the vehicle is geographically located. For example, a vehicle of a certain make and model that is bound for Maui, Hi., with its many beaches, salty air, and sunshine is painted using the same paint formulation as a vehicle of the same certain make and model that is bound for Fargo, N. Dak., with its harsh winters. The paint formulation may be well-suited for cold conditions, but may not fare well in the extreme sun, and may show signs of fading earlier than is desired.

The systems and methods described herein use sensors on the vehicles to detect paint data that is used to improve formulations of paint to be used in future vehicles that are sent to particular geographic regions. By adjusting the paint based on the geographic region, the appearance of the vehicle across all geographic regions may be made more consistent over time, as compared to using the same paint composition for all vehicles, which may result in a more consistent initial appearance across all geographic regions.

The systems and methods described herein supplement conventional chemical formulation research and development with an automated approach using large amounts of data collection and data analysis including but not limited to Big Data and, Learning Algorithms. The automated approach may reduce the amount of manual and tedious experimentation conventionally used to formulate new paint compositions. Further, those conventional manually formed compositions are not tailored to particular geographic regions. Further, the systems described herein will continuously learn and optimize paint formulation to be more weather resistant and/or environmental conditions resistant.

The systems and methods described herein are an improvement to the technology of creating paint formulations for vehicles. The systems and methods described herein require the use of computer technology (e.g., Remote Server, Machine Learning Algorithms, Big Data, Data Mining, Data Analysis) to improve the paint formulations of future vehicles in a timely manner. If a human being were to manually process the amount of data from the sensors of the vehicles, the human being would not be able to effectively respond to the ever-changing climate and weather. The systems and methods described herein use sensors to transform the detected paint data into an improved chemical paint formulation.

Figure 1:
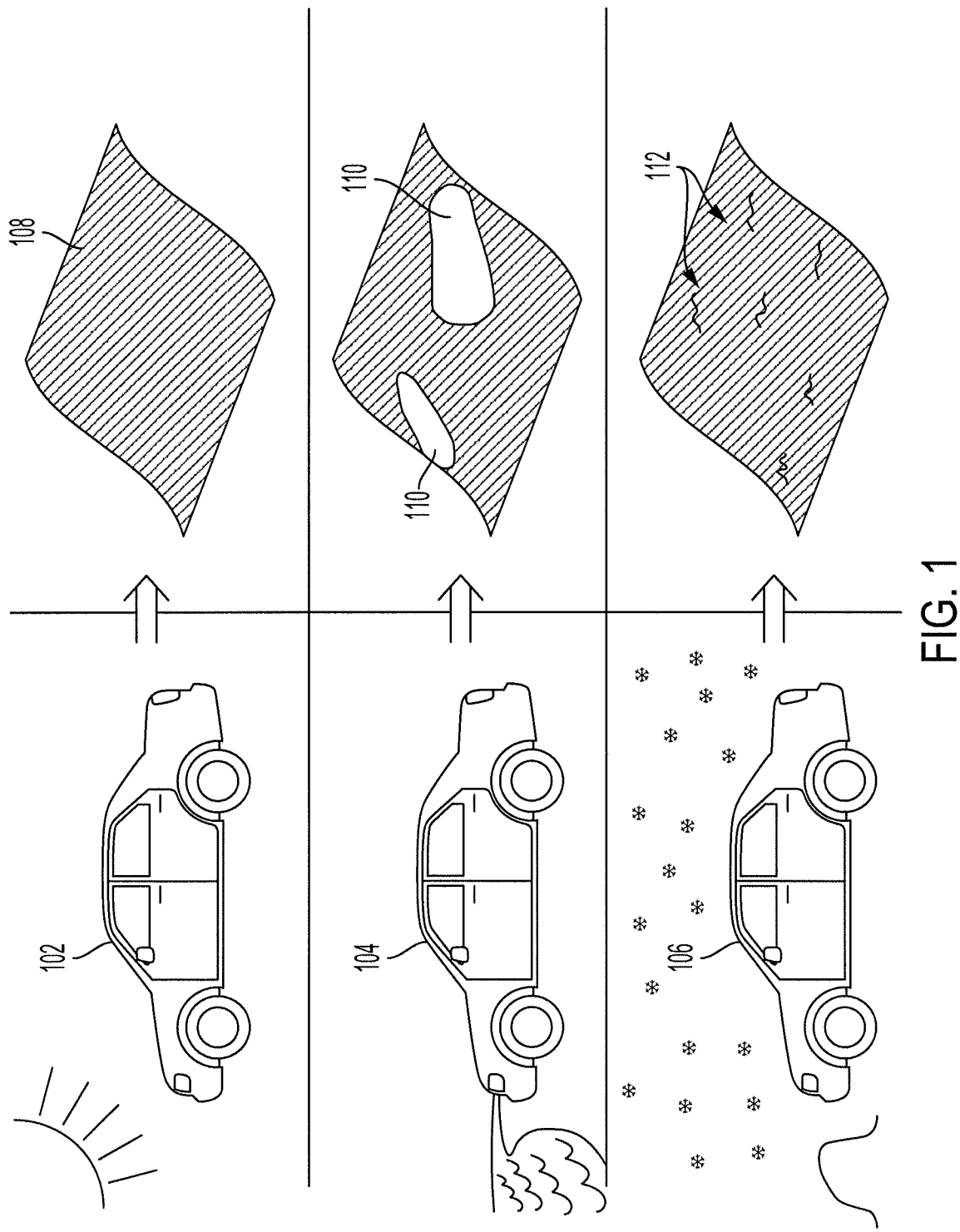
FIG. 1 illustrates vehicles in different geographic regions and paint issues of those geographic regions.

FIG. 1 illustrates vehicles in different weather conditions. The first vehicle 102 is located in an area that receives an abundance of sunlight. Accordingly, the paint 108 of the first vehicle 102 may become faded over time. The ultraviolet rays of the Sun may cause the chemical bonds of the paint 108 to break down, thus causing the paint to appear faded. The first vehicle 102 may also have plant pollen become deposited onto the vehicle and the plant pollen may cause chemical reactions with the paint.

The second vehicle 104 is located in an area that is close to a coast of an ocean. Accordingly, there may be more salt in the air from the nearby ocean. The sunlight may open the pores of the second vehicle's paint and increase absorption of salty moisture in the air. The salt, over time, causes corrosion and may create wear in the paint and vehicle parts protected by the paint and other coatings. The spots 110 in the body of the second vehicle 104 show the corrosive effects of the second vehicle 104 being located close to the ocean. In addition, the sand from the nearby ocean may become deposited onto the vehicle and cause scratching of the paint. In this example, the system described herein will develop a more scratch resistant paint as the vehicle (or sensors on the vehicle) will collect the paint data that will be used to improve the painting process.

The third vehicle 106 is located in an area that experiences snowfall. The snow may accumulate on the third vehicle 106 and erode the paint. In addition, salt or other chemicals used to melt ice on the roads and streets may cause damage to the paint of the third vehicle 106. The debris and minerals in the snow as well as the salt or other chemicals used to melt ice may abrade the paint and cause localized wear 112, such as chipping, scratching, corrosion, or fading. In addition, the dryness of the air in extreme winter conditions may also damage the paint by fading it.

As described herein, vehicles sold in a particular geographic region tend to stay within the same geographic region. For example, a vehicle sold in a coastal city, such as Manhattan Beach, Calif., or Honolulu, Hi. will most likely spend most of its time in the same coastal geographic region. Likewise, a vehicle sold in an area which experiences harsh winters, such as Buffalo, N.Y. or Anchorage, Ak., will most likely spend most of its time in the same geographic region susceptible to harsh winter conditions. Therefore, vehicles which are delivered to a particular geographic region may be painted in a manner unique to the particular geographic region, in order to optimize the appearance of the vehicle and in order to protect the integrity of the metal components underneath the paint.

In order to determine how to best paint a vehicle, the particular conditions of a geographic region may be determined. In particular, the effect that the weather, terrain, environment of a geographic region, and vehicle usage conditions has on the paint of a vehicle may be determined. Once determined, the effect of the geographic region and/or the vehicle usage conditions on the paint of the vehicle may be factored into the painting process of future vehicles to be delivered to the geographic region. Adjustments to the painting process may include adjustments in paint composition and/or steps performed in painting the vehicle. In addition, the effect of the geographic region on the paint of the vehicle may be factored into the painting process when the vehicle is repainted or when new vehicles are manufactures and painted with the newly created and/or optimized painting process.

Thus, using the systems and methods described herein, the first vehicle 102 may have a different paint composition than the second vehicle 104 or the third vehicle 106, even though they may be the same make, model, year, and color; however, they maintain the same aesthetic appearance. These locally tailored paint compositions may aid in ensuring the paint of the vehicles lasts longer than if a standard paint composition was used for all of the vehicles.

Figure 2:
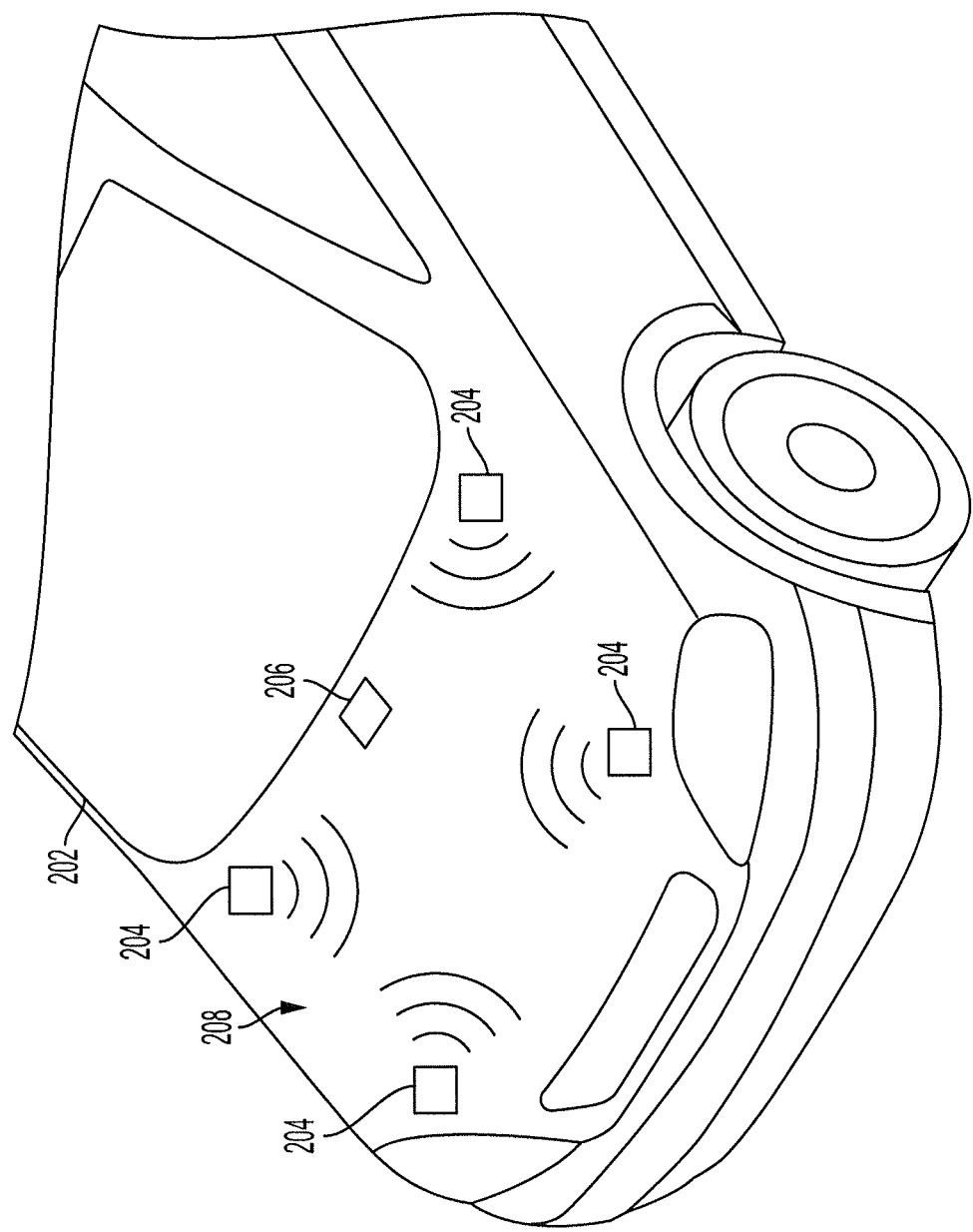
FIG. 2 illustrates a vehicle having paint sensors and an ambient light sensor, according to various embodiments of the invention.

FIG. 2 illustrates a plurality of sensors located on a vehicle 202, according to embodiments of the invention. The sensors include a plurality of paint sensors 204 and at least one light sensor 206.

The paint sensors 204 are located on an exterior surface 208 of the vehicle 202. The paint sensors 204 may be spaced apart from each other in such a manner that substantially all regions of the vehicle 202 are covered by at least one paint sensor 204. In some embodiments, the paint sensors 204 may be retractable and driven by an actuator such that the paint sensors 204 may be hidden in a non-protruding manner when paint data is not being detected. In some embodiments, the paint sensors 204 remain stationary on the exterior surface of the vehicle 202 and are not retractable.

The paint sensors 204 are configured to detect paint data, which may be a measure of one or more characteristics of the paint of the vehicle 202. The one or more characteristics of the paint of the vehicle 202 may be tracked over time to determine trends in the condition of the vehicle paint. The paint sensors 204 may be image sensors, and the paint data may include at least one of a paint color density, a paint integrity, a paint consistency, and/or a paint color. The paint color density may be tracked over time to determine whether the paint is fading or dulling. The paint integrity may indicate whether the paint is chipping or peeling. The paint consistency may indicate whether there are any spots of corrosion or spots of localized fading. The paint color may be tracked over time to determine whether the color remains consistent or whether the paint color may distort into another paint color when compared to the original paint color.

The ambient light sensor 206 may be located on the exterior surface 208 of the vehicle 202. The ambient light sensor 206 may be retractable or may be permanently located on the exterior surface 208 of the vehicle 202. The ambient light sensor 206 is configured to detect ambient light data indicating a level of ambient light surrounding the vehicle 202. The ambient light data is used to ensure that the conditions under which the paint data is detected remain consistent.

In some embodiments, the ambient light data is used to augment the paint data such that the paint data is normalized to a particular baseline ambient light environment. For example, the ambient light data at a given moment may indicate that there is a high amount of sunshine. The amount of sunshine may be measured in lumens or lux, and in the example, there may be 50,000 lux detected by the light sensor 206. In this example, the paint color density measurement detected by the paint sensor 204 may be increased by a multiplier to compensate for the brightness of the ambient light, as a bright ambient light may cause the paint of the vehicle 202 to appear washed out or dulled more than the paint actually is. In some embodiments, a formula is used to factor in the amount of ambient light detected by the light sensor 206 to determine a normalized paint color density.

In some embodiments, the ambient light data is used as a trigger for detection of paint data by the paint sensors 204. For example, it may be the case that the most accurate detections of paint data occur when the ambient light is between a lower ambient light threshold and an upper ambient light threshold. Accordingly, when the light sensor 206 indicates that the detected ambient light is between the lower ambient light threshold and the upper ambient light threshold, the paint sensors 204 may then be instructed to detect paint data. For example, the paint sensors 204 may be instructed to detect paint data when the light sensor 206 detects ambient light between 10,000 lux and 25,000 lux. A determination of when to detect the paint data and when to submit the paint data and/or the ambient light data to a remote data server may be made by an ECU of the vehicle.

In some embodiments, the paint sensors 204 are scheduled to periodically detect paint data of the vehicle 202, and when the paint sensors 204 detect the paint data, the light sensor 206 detects ambient light data. In these embodiments, the paint data may be paired with the ambient light data in data storage, and further analysis may be performed on the paint data and the ambient light data at a later time by the remote data server. For example, when the paint data and ambient light data are detected a relatively large number of times (e.g., 10,000 times in the span of a year), there may be enough data to track the paint data over time at various ambient light conditions. That is, there may be enough data to establish a statistically significant sample size at various ambient light conditions. As will be described herein, environment data may also be considered in addition to the paint data and the ambient light data.

While FIG. 2 illustrates the paint sensors 204 as being near the front of the vehicle 202, the paint sensors 204 may be located anywhere on the vehicle 202, such as on the trunk or near the roof. Similarly, the light sensor 206 may be located anywhere on the vehicle 202. In some embodiments, the light sensor 206 may be located inside of the vehicle and adjacent to a window. Allocation of multiple sensors in the vehicle may assist in determining color affects under various light angles.

Figure 3:
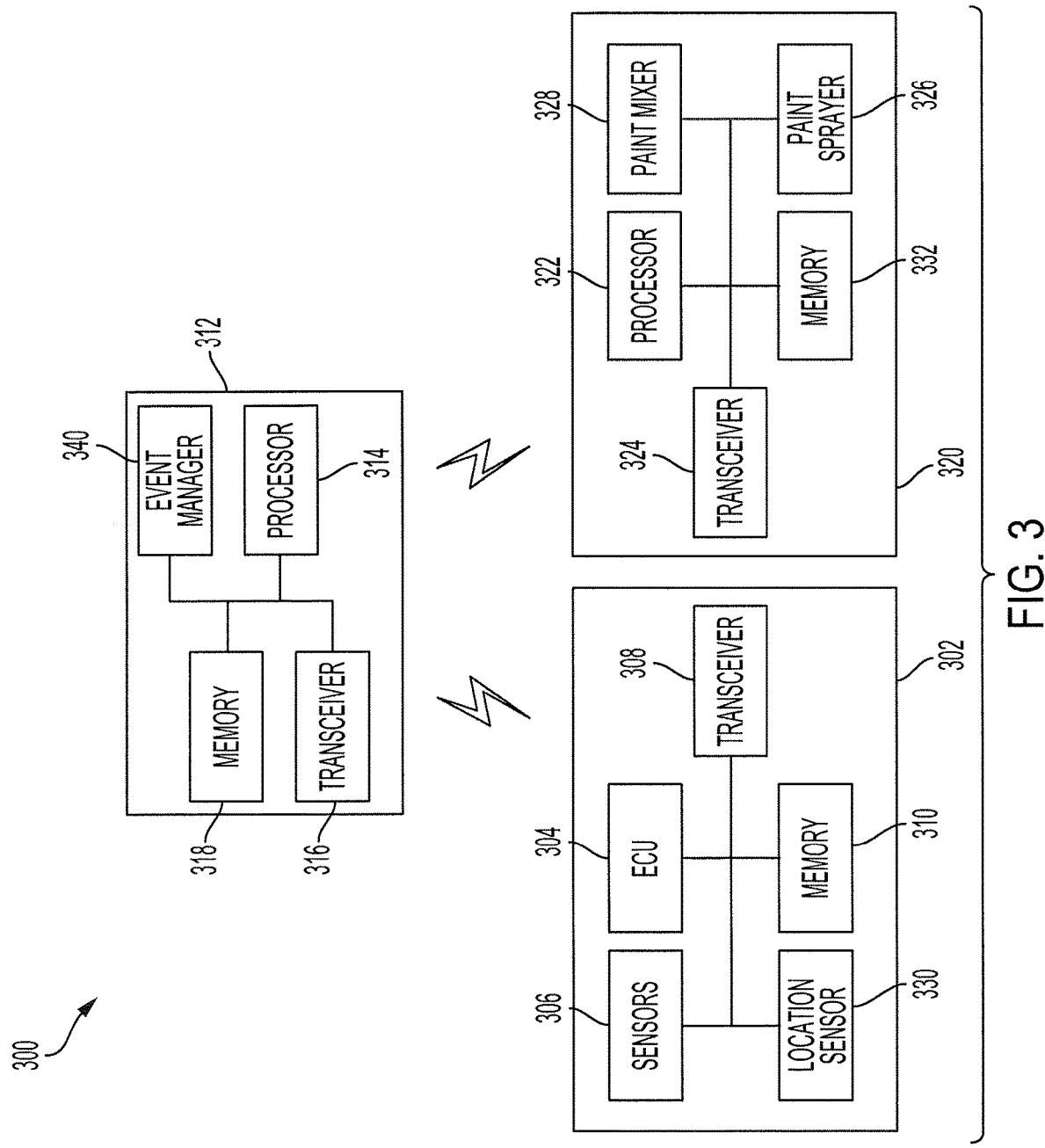
FIG. 3 illustrates a diagram of the system, according to various embodiments of the invention.

FIG. 3 illustrates a block diagram of the system 300. The system 300 includes a vehicle 302 similar to the vehicles described in FIGS. 1 and 2.

The vehicle 302 may have an automatic or manual transmission. The vehicle 302 is a conveyance capable of transporting a person, an object, or a permanently or temporarily affixed apparatus. The vehicle 302 may be a self-propelled wheeled conveyance, such as a car, a sports utility vehicle, a truck, a bus, a van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 302 may be semi-autonomous vehicle or an autonomous vehicle. That is, the vehicle 302 may be self-maneuvering and navigate without human input. An autonomous vehicle may use one or more sensors and/or a navigation unit to drive autonomously.

The vehicle 302 includes an ECU 304, sensors 306, a transceiver 308, a memory 310, and a location sensor 330. All of the elements of the vehicle 302 may be connected via a communications bus. The ECU 304 may be one or more ECUs, appropriately programmed, to control one or more operations of the vehicle. The one or more ECUs 304 may be implemented as a single ECU or in multiple ECUs. The ECU 304 may be electrically coupled to some or all of the components of the vehicle in a wired or wireless fashion. In some embodiments, the ECU 304 is a central ECU configured to control one or more operations of the entire vehicle. In some embodiments, the ECU 304 is multiple ECUs located within the vehicle and each configured to control one or more local operations of the vehicle. In some embodiments, the ECU 304 is one or more computer processors or controllers configured to execute instructions stored in a non-transitory memory 310.

The sensors 306 may include paint sensors (e.g., paint sensors 204) and light sensors (e.g., light sensor 206). As described herein, the paint sensors are configured to detect paint data associated with the paint of the vehicle 302, and the light sensors are configured to detect ambient light data associated with the vehicle 302.

The sensors 306 may also include other environmental sensors, such as an altimeter configured to detect altimeter data indicating an elevation of the vehicle, a hygrometer configured to detect humidity data indicating a humidity of the air around the vehicle, a pollen sensor configured to detect pollen data indicating pollen levels in the air around the vehicle, a pH sensor configured to detect pH data indicating a pH of rain or other precipitation experienced by the vehicle, a thermometer configured to detect temperature data indicating a temperature of the air around the vehicle and/or the surface temperature of an exterior surface of the vehicle, or a chemical sensor configured to measure chemical levels in the air. The environmental data from each of these sensors may be used to determine aspects of the environment of the vehicle which may affect the paint of the vehicle.

For example, vehicles that are operated in higher altitudes may suffer from increased fading due to the thinner, drier air at higher altitudes. Vehicles located in higher humidity areas may suffer from localized wear, as the increased moisture in the air may encourage debris on the vehicle to bore into the paint and allow for corrosion. Vehicles located in areas with high levels of pollen or other chemicals (naturally occurring or synthetic) may also suffer from localized wear. Vehicles in areas of acidic precipitation may experience increased fading of the paint. Vehicles located in areas with high chemical concentrations in the air may also experience increased fading of the paint. The environmental data may be used in addition to or in lieu of the location data. In some embodiments, a particular geographic area may have many variations in environmental features.

The vehicle 302 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 302 to a remote data server 312.

The transceiver 308 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 308 may transmit data to and receive data from devices and systems not physically connected to the vehicle. For example, the ECU 304 may communicate with the remote data server 312. Furthermore, the transceiver 308 may access the network, to which the remote data server 312 is also connected.

The location sensor 330 is connected to the ECU 304 and configured to determine location data. The ECU 304 may use the location data along with map data stored in memory 310 to determine a location of the vehicle. In other embodiments, the location sensor 330 has access to the map data and may determine the location of the vehicle and provide the location of the vehicle to the ECU 304. The location sensor 330 may be a GPS unit, a GLONASS system device, a Galileo system device, or any other global location detection device. In some embodiments, remote data server 312 receives the location data and combines the location data with the data from the vehicle (e.g., paint data, ambient light data, and/or environmental data).

Comparing the paint data with different location data may provide data points used to determine the effect of location on the paint of the vehicle. For example, a vehicle that is in a coastal geographic region 75% of the time may spend the remaining 25% of the time in a geographic region that encounters heavy snowfall. The location data may be used to separate the paint data associated with the vehicle's time in the coastal geographic region from the paint data associated with the vehicle's time in the heavy snowfall geographic region. Once separated, the paint data detected at the coastal geographic region may be compared with the paint data detected at the heavy snowfall geographic region.

The memory 310 is connected to the ECU 304 and may be connected to any other component of the vehicle. The memory 310 is configured to store any data described herein, such as the paint data, the ambient light data, map data, the location data, the environmental data, the data received from any other sensors, and any data received from the remote data server 312 via the transceiver 308.

The paint data, the ambient light data, the location data, and/or the environmental data may be communicated from the vehicle 302 to the remote data server 312 via the transceiver 308 of the vehicle 302 and the transceiver 316 of the remote data server 312. The remote data server 312 includes a processor 314, a transceiver 316, a memory 318, and an event manager 340, all connected to each other via a communications bus. The processor 314 (and any processors described herein) may be one or more computer processors configured to execute instructions stored on a non-transitory memory. The memory 318 may be a non-transitory memory configured to store data associated with the paint of a plurality of vehicles, such as the paint data, ambient light data, location data, environmental data, data received from other sensors, and data received from other inputs (e.g., vehicle usage conditions or current paint formula) of the vehicle 302. The memory 318 may serve as a data repository for all of the data used to determine trends in paint conditions. The transceiver 316 may be configured to transmit and receive data, similar to transceiver 308. The event manager 340 may be a sorted collection of the data received by the plurality of vehicles. The event manager 340 may sort the data in any way that increases the processor's ability to efficiently access the data.

The processor 314 of the remote data server 312 is configured to determine trends (as described further herein in FIG. 5) in paint conditions of vehicles based on the paint data, the ambient light data, the location data, and the environmental data received from a plurality of vehicles, such as vehicle 302. The memory 318 may also store a record of the composition of paint used on a particular vehicle and/or the painting process used to paint the particular vehicle. The memory 318 may be provided the information from the manufacturers of the vehicles. In some embodiments, the memory 318 may store a table that associates every make, model, year, color, and regions (e.g., sales region and/or usage region) of a vehicle with a particular paint composition. In some embodiments, the vehicle 302 may provide the particular paint composition. For example, when the vehicle 302 communicates the paint data, the ambient light data, the location data, and/or the environmental data to the remote data server 312, the vehicle 302 may also communicate an identifier that the remote data server 312 may use to reference the paint composition of the vehicle 302, or the vehicle 302 may also communicate the paint composition directly to the remote data server 312.

The processor 314 may analyze the paint data to determine an improved formulation of paint based on the types of wearing and fading experienced by the vehicles. For example, when the data from a plurality of vehicles from an area with heavy snowfall during the winter shows fading of the paint and increased peeling of paint, the processor 314 may determine that a particular compound (e.g., acrylic) should be increased in one or more of the coats (e.g., base coat, primer, or clear coat). The processor 314 may determine based on computer simulations (e.g., Data Analysis and Cloud Computing) that increasing the acrylic in the paint for vehicles of this particular geographic region will better protect the paint from fading and peeling. If the paint formulation is changed after data analysis is performed, input may be provided to the processor 314 for awareness and further optimization analysis based on the current paint formula.

The processor 314 may also analyze the paint data to determine an improved process of painting the vehicle based on the types of wearing and fading experienced by the vehicles. The process of painting the vehicle may include an order of steps to be performed during the painting process. The process of painting the vehicle may also include an amount of time to cure the paint or other coatings applied to the vehicle. For example, applying two layers of clear coat or applying multiple layers of paint may increase the durability of the paint in a first geographic region, but may cause the paint to chip or peel more easily in a second geographic region.

The processor 314 may use machine learning techniques to improve upon the adjustments to the paint formulations. In some embodiments, the processor 314 does not make an adjustment to the paint formulation of a particular region until a threshold sample size of data has been received from one or more vehicles (e.g., vehicle 302).

The processor 314 may use the paint data and the location data to analyze the effects of various geographic regions on a particular formulation of paint. For example, a first vehicle may be painted with a mixture of 20% Compound A, 50% Compound B, and 30% Compound C. When the first vehicle is in a sunny, desert geographic region between the months of April and September, the paint data may indicate that there is an insignificant amount of fading, and the paint data may indicate that the paint integrity is relatively good. When the first vehicle is in a mountainous geographic region with heavy snowfall between the months of October and March, the paint data may indicate that the paint integrity and the paint color density suffers considerably.

In contrast, a second vehicle may be painted with a mixture of 60% Compound A, 10% Compound B, and 30% Compound C. The second vehicle may also be in a sunny, desert geographic region between the months of April and September and a mountainous geographic region with heavy snowfall between the months of October and March. However, the paint data of the second vehicle may indicate that it has an insignificant amount of fading when the second vehicle is in the mountainous geographic region, and poor paint integrity and paint color density when the second vehicle is in the sunny, desert geographic region.

The processor 314 may, using this data, determine that Compound A responds well to heavy snowfall, but poorly to desert conditions, and that Compound B responds well to desert conditions, but poorly to heavy snowfall. Thus, for vehicles which will be delivered to desert areas, the amount of Compound B in the paint mixture may be increased, and the amount of Compound A in the paint mixture may be decreased.

As the atmospheric conditions that give rise to conditions that affect paint are inconsistent from year to year, month to month, or even week to week, the paint formulations may accordingly be continuously updated based on the paint data from the vehicles, in order to provide the most durable painting of the vehicle possible.

Other trends may be determined from the paint data, ambient light data, the location data, and the environmental data that may affect the paint of the vehicle. The processor 314 of the remote data server 312 may detect behavioral trends in vehicle operators that may affect the paint of the vehicle. For example, the ambient light data and the location data may indicate to the remote data server 312 that in a particular metropolitan area, a vast majority of the vehicles are parked outdoors. This may be due to inadequate and/or expensive indoor parking facilities or any other number of factors. The ambient light data may indicate that, for example, the vehicle is exposed to sunlight for at least 10 hours between the hours of 6 A.M. and 6 P.M., and the location data may also indicate that the vehicle is not located within a parking garage or other covered structure for at least 16 hours of most days.

Based on this determination that many vehicles in the particular metropolitan area are not parked indoors, the processor 314 may determine that more durable paint formulations may be appropriate for future vehicles to be delivered to this particular metropolitan area.

The processor 314 of the remote data server 312 may exclude the paint data from certain vehicles which may not be indicative of the usage of the general population, such as paint data from law enforcement vehicles, firefighting vehicles, lifeguard vehicles, security vehicles, vehicles used for ridesharing, or vehicles used for delivery, for example. This information about each vehicle may be stored by the remote data server 312 in the memory 318, or the particular vehicle may communicate this type of data to the remote data server 312.

In some embodiments, the paint data from certain vehicles may be analyzed separately in order to provide improved paint formulations to those vehicles. For example, when the paint data of firefighting vehicles indicates an increased occurrence of peeling of the paint exists, ostensibly due to the exposure to high heat of fires, the processor 314 may determine an improved paint formulation to prevent the paint peeling.

The remote data server 312 may be communicatively coupled to a paint machine 320. The remote data server 312 may be directly connected to the paint machine 320 via a data cable, or may be connected to the paint machine 320 via a network, such as a local area network or the Internet.

The paint machine 320 includes a processor 322, a memory 332, a transceiver 324, a paint sprayer 326, and a paint mixer 328, which may all be connected to each other via a communications bus. The processor 322 may be one or more computer processors configured to execute instructions stored on a non-transitory memory. The memory 332 may be a non-transitory memory configured to store data. The transceiver 324 may be configured to transmit and receive data, similar to transceivers 308 and 316.

The paint mixer 328 may store a plurality of paint compounds and colors, and the paint mixer 328 may be configured to automatically create a paint mix using the stored paint compounds and colors. The paint sprayer 326 is configured to spray the paint mix created by the paint mixer 328 onto a vehicle. The paint sprayer 326 may also be configured to execute a series of steps in the painting process. The painting process provided to the paint sprayer 326 may include a particular order of paint, primer, coatings, and other materials to be sprayed onto the vehicle.

The processor 322 of the paint machine 320 may receive a paint formulation from the remote data server 312 and may instruct the paint mixer 328 to create the paint formulation received from the remote data server 312. The processor 322 may then instruct the paint sprayer 326 to apply the paint formulation to a vehicle. The processor 322 of the paint machine 320 may also receive a painting process from the remote data server 312 and may instruct the paint sprayer 326 to perform the steps identified in the painting process.

In some embodiments, the detection of paint data, improvements to the paint formulations based on the paint data, and the application of the improved paint formulations may be performed automatically and without human intervention. As climate conditions and environmental condition affecting the paint of vehicles is constantly in a state of change, there is a need for the improvement of paint formulations to be performed in a time-sensitive manner. Thus, the system 300 requires use of computers and computing devices and cannot be performed by a human being alone.

While only one vehicle 302 is shown, any number of vehicles may be used. Likewise, while only one remote data server 312 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple vehicles or sensors may be used to increase the robustness of paint data, ambient light data, environmental data, and location data considered by the processor 314 of the remote data server 312. Multiple remote data serves may be interconnected using any type of network, or the Internet.

As used herein, a "unit" may refer to hardware components, such as one or more computer processors, controllers, or computing devices configured to execute instructions stored in a non-transitory memory.

Figure 4:
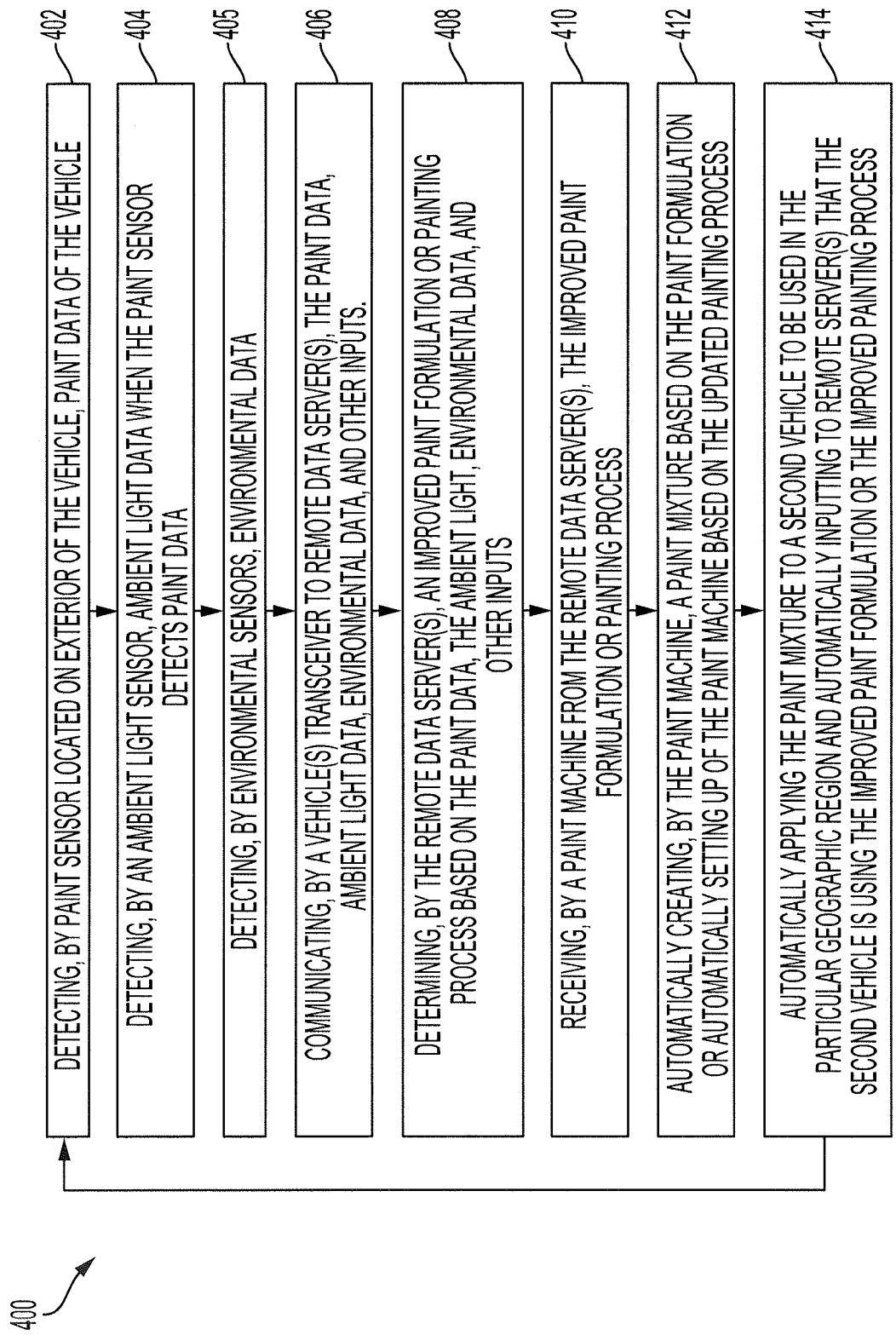
FIG. 4 illustrates a process for improving vehicle paint of a vehicle in a particular geographic region, according to various embodiments of the invention.

FIG. 4 is a flow diagram of a process 400 for improving vehicle paint of a vehicle in a particular geographic region.

A paint sensor (e.g., paint sensor 204) located on an exterior of the vehicle (e.g., vehicle 202 or vehicle 302) detects paint data of the vehicle (step 402). The paint data may be a measure of one or more characteristics of the paint of the vehicle. The paint data may include at least one of a paint color density, a paint integrity, a paint consistency, and/or a paint color.

An ambient light sensor (e.g., ambient light sensor 206) detects ambient light data when the paint sensor detects the paint data (step 404). The ambient light sensor is configured to detect ambient light data indicating a level of ambient light surrounding the vehicle. The ambient light data is used to ensure that the conditions under which the paint data is detected remain consistent.

One or more environmental sensors detect environmental data (step 405). The environmental sensors may include an altimeter configured to detect altimeter data indicating an elevation of the vehicle, a hygrometer configured to detect humidity data indicating a humidity of the air around the vehicle, a pollen sensor configured to detect pollen data indicating pollen levels in the air around the vehicle, a pH sensor configured to detect pH data indicating a pH of rain or other precipitation experienced by the vehicle, a thermometer configured to detect temperature data indicating a temperature of the air around the vehicle and/or the surface temperature of an exterior surface of the vehicle, or a chemical sensor configured to measure chemical levels in the air. The environmental data from each of these sensors may be used to determine aspects of the environment of the vehicle which may affect the paint of the vehicle.

A vehicle transceiver (e.g., transceiver 308) communicates, to a remote data server (e.g., remote data server 312), the paint data, the ambient light data, the environmental data, and any other inputs (step 406). In some embodiments, the ambient light data is used to augment the paint data such that the paint data is normalized to a particular baseline ambient light environment. In other embodiments, only the paint data detected within a particular range of ambient light data may be used in determining an improved paint formulation. The other inputs may include terrain data associated with the location of the vehicle, vehicle usage data associated with the vehicle, the current vehicle paint formulation data, and the current vehicle painting process data.

The remote data server determines an improved paint formulation or an improved painting process based on the paint data, the ambient light data, the environmental data, and/or other inputs (step 408). The chemical composition of the paint used in future vehicles sent to the geographic region of the vehicle or the painting process used to paint these vehicles may be adjusted based on the paint data, the ambient light data, and/or the environmental data.

A paint machine (e.g., paint machine 320) receives the improved paint formulation or the improved painting process from the remote data server (step 410). The paint machine may include a paint mixer (e.g., paint mixer 328) and a paint sprayer (e.g., paint sprayer 326). The paint mixer may be configured to form a paint mix based on a given paint formulation. The paint sprayer may be configured to apply a given paint mix to a vehicle. The paint sprayer may also be configured to perform a particular set of painting steps.

The paint machine automatically creates the paint mixture based on the received improved paint formulation or automatically sets up the paint sprayer based on the received improved painting process (step 412). The paint mixture may be automatically created by the paint mixer.

The paint machine automatically applies the paint mixture to a second vehicle to be used in the particular geographic region (step 414). In this way, the second vehicle benefits from the paint data detected by a prior vehicle. Data from this second vehicle painted with the new formula or using the new process may be sent to a remote data server for awareness. This updated information may be used for further paint analysis and further process optimization. The paint machine may also automatically perform the steps of the improved painting process when painting the second vehicle.

Figure 5:
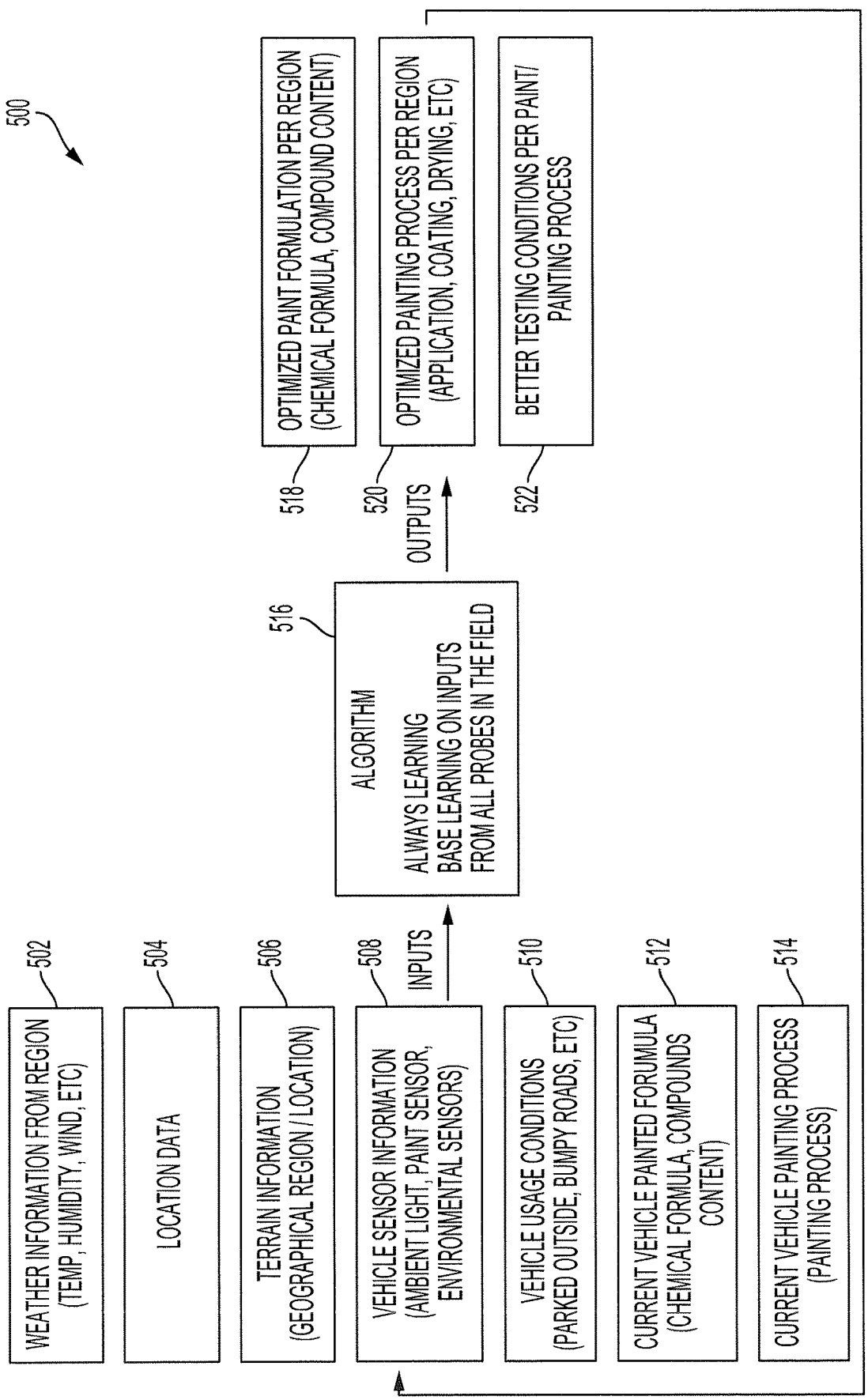
FIG. 5 illustrates a process performed by the remote data server, according to various embodiments of the invention.

FIG. 5 illustrates an example process 500 using an example algorithm 516 to be performed by the processor of the remote data server (e.g., processor 314 of the remote data server 312).

The processor of the remote data server is connected to a plurality of vehicles, and from each of the vehicles, the processor receives various types of data to be used as inputs to the algorithm 516. The inputs to the algorithm include: weather data 502 associated with the weather of a region of each respective vehicle, location data 504 associated with the location history of each respective vehicle, terrain data 506 associated with the location history of each respective vehicle, vehicle sensor data 508 (e.g., ambient light data, paint data, and environmental data, as described herein) associated with each respective vehicle, vehicle usage condition data 510 associated with each respective vehicle, current vehicle paint formulation data 512 associated with each respective vehicle, and current vehicle painting process data 514 associated with each respective vehicle.

The weather data 502 may include various weather measurements associated with the particular vehicle, including temperature, humidity, and wind speed, for example. The location data 504, as described herein, may be a tracking of the location history of the particular vehicle. The terrain data 506 may include various topographical and terrain information corresponding to the location history of the particular vehicle. The vehicle sensor data 508 is as described herein and relating to any data detected by one or more sensors of the vehicle. The vehicle usage condition data 510 may include where the vehicle is parked, what purpose the vehicle primarily serves, the quality of the roads it is driven on, among other things. The current vehicle paint formulation data 512 of a particular vehicle and a current vehicle painting process data 514 of a particular vehicle are as described herein.

All of the data used as inputs to the algorithm 516 may be received by the remote data server from a plurality of vehicles, and the data used as inputs to the algorithm 516 may be stored in memory or a data repository accessible to the processor of the remote data server. The data used as inputs may be organized by an event manager (e.g., event manager 340) in order to allow the processor to efficiently process the data.

The algorithm 516 receives the inputs 502-514 and detects trends in the data related to vehicle paint condition. The algorithm 516 is continuously learning based on new data received as inputs. In many embodiments, the more data received by the algorithm 516, the more complete and the more robust the trends detected may be. In many embodiments, the algorithm 516 uses machine learning techniques to produce the outputs 518-522 based on the inputs 502-514.

The algorithm 516 may produce one or more outputs. The outputs may include an optimized paint formulation per region 518, an optimized painting process per region 520, and/or improved testing conditions per paint formulation or painting process 522.

The optimized paint formulation 518 may be an improved chemical formula or compound content that is to be used on vehicles in a particular region (e.g., sales region or geographic region). The optimized painting process 520 may be an improved series of steps to be performed when painting the vehicle, such as application of paint, primer, and/or coatings, performing drying or curing steps. The optimized painting process 520 may include the order the steps are to be performed in, as well as the duration and spray pattern, spray direction, or any other painting process specific information. The improved testing conditions per paint formulation or painting process 522 may be improved conditions for detecting paint data and ambient light data, such that subsequent input data received by the algorithm 516 is in an improved condition for use by the algorithm 516 for optimizing the outputs 518-522. Accordingly, an arrow indicates that the outputs 518-522 may affect the inputs 502-514 in subsequent iterations.

Figure 6:
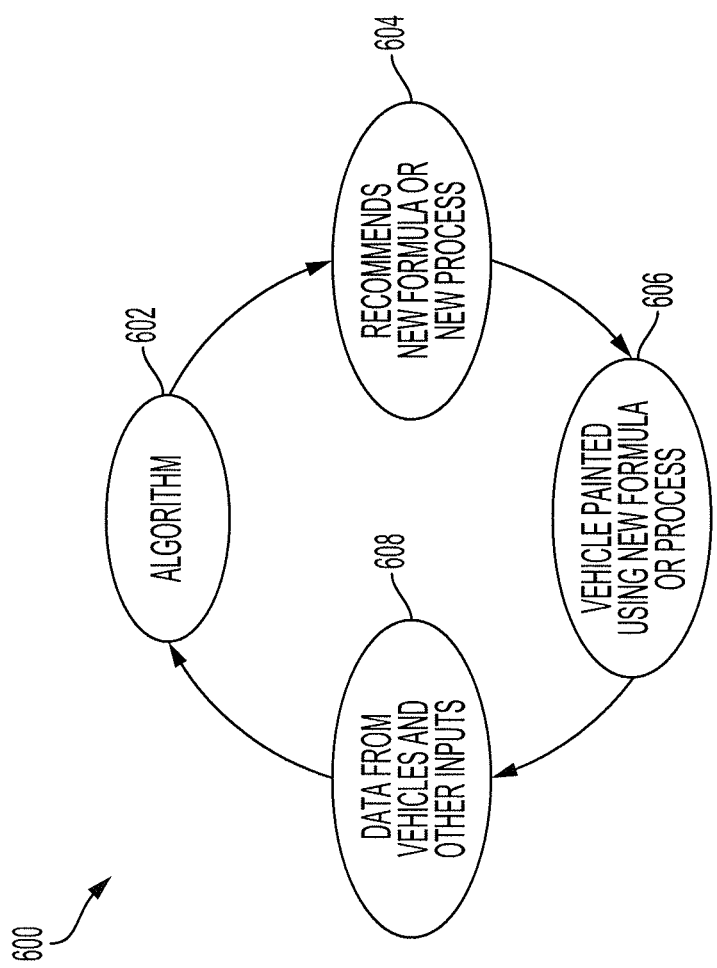
FIG. 6 illustrates a process of continuous improvement of paint formulation and painting processes, according to various embodiments of the invention.

FIG. 6 illustrates a process 600 of continuous and automatic improvement of the paint of the vehicles, using the systems and methods described herein.

The algorithm 602 (e.g., algorithm 516) takes as inputs data from vehicles and other inputs (e.g., inputs 502-514). The algorithm 602 provides recommendations of improved paint formulations or improved painting processes 604 (e.g., outputs 518-522). The improved paint formulations or improved painting processes 604 are used to paint new vehicles 606. The vehicles painted using the improved paint formulations or improved painting processes provide data 608, and the data 608 is used as inputs to the algorithm 602. The process 600 continues and may be performed continuously and endlessly, producing improved paint formulations or improved painting processes with every cycle.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for improving formulating vehicle paint of a vehicle in a particular geographic region, the system comprising:
    a paint sensor located on an exterior of the vehicle and configured to detect paint data of the vehicle;
    an ambient light sensor configured to detect ambient light data of ambient light outside of the vehicle when the paint sensor detects the paint data;
    a vehicle transceiver configured to communicate the paint data and the ambient light data;
    a remote data server configured to receive the paint data and the ambient light data from the vehicle and formulate, based on the paint data and the ambient light data, a different paint composition of paint compounds for application on the vehicle or a second vehicle or a different painting process for painting the vehicle or the second vehicle; and
    a paint machine communicatively coupled to the remote data server and configured to automatically create a paint mixture based on the different paint composition, automatically apply the paint mixture to the vehicle or the second vehicle, or automatically perform the different painting process when painting the vehicle or the second vehicle.

2. The system of claim 1, further comprising a location sensor located on the vehicle and configured to determine location data associated with the vehicle when the paint data and the ambient light data are detected, and
    wherein the vehicle transceiver is further configured to communicate the location data and the remote data server is further configured to receive the location data and formulate the different paint composition or formulate the different painting process based on the paint data, the ambient light data, and the location data.

3. The system of claim 1, further comprising one or more environmental sensors configured to detect environmental data including at least one of altimeter data indicating an elevation of the vehicle, humidity data indicating a humidity of the air around the vehicle, pollen data indicating pollen levels in the air around the vehicle, pH data indicating a pH of rain or other precipitation experienced by the vehicle, or temperature data indicating a temperature of the air around the vehicle or the surface temperature of an exterior surface of the vehicle, and
    wherein the vehicle transceiver is further configured to communicate the environmental data and the remote data server is further configured to receive the environmental data and formulate the different paint composition or determine the different painting process based on the paint data, the ambient light data, and the environmental data.

4. The system of claim 1, wherein the paint sensor is further configured to detect the paint data periodically, and
    wherein the paint data includes at least one of a paint color density, a paint integrity, a paint consistency, or a paint color.

5. The system of claim 1, wherein the paint sensor is further configured to detect the paint data when the ambient light data indicates an ambient light level within a particular range.

6. The system of claim 1, wherein the remote data server is further configured to formulate the different paint composition based on a current paint composition of the vehicle in addition to the paint data and the ambient light data.

7. A system for formulating vehicle paint of a vehicle in a particular geographic region, the system comprising:
    a paint sensor located on an exterior of the vehicle and configured to detect paint data of the vehicle, the paint sensor being an image sensor;
    an ambient light sensor configured to detect ambient light data of ambient light outside of the vehicle when the paint sensor detects the paint data;
    a vehicle transceiver configured to communicate the paint data and the ambient light data; and
    a remote data server configured to receive the paint data and the ambient light data from the vehicle and formulate, based on the paint data and the ambient light data, a different paint composition of paint compounds for application on the vehicle or a second vehicle or a different painting process for painting the vehicle or the second vehicle.

8. The system of claim 7, further comprising a paint machine communicatively coupled to the remote data server and configured to automatically create a paint mixture based on the different paint composition, automatically apply the paint mixture to the vehicle or the second vehicle, or automatically perform the different painting process when painting the vehicle or the second vehicle.

9. The system of claim 7, further comprising a location sensor located on the vehicle and configured to determine location data associated with the vehicle when the paint data and the ambient light data are detected, and wherein the vehicle transceiver is further configured to communicate the location data and the remote data server is further configured to receive the location data and formulate the different paint composition or formulate the different painting process based on the paint data, the ambient light data, and the location data.

10. The system of claim 7, further comprising one or more environmental sensors configured to detect environmental data including at least one of altimeter data indicating an elevation of the vehicle, humidity data indicating a humidity of the air around the vehicle, pollen data indicating pollen levels in the air around the vehicle, pH data indicating a pH of rain or other precipitation experienced by the vehicle, or temperature data indicating a temperature of the air around the vehicle or the surface temperature of an exterior surface of the vehicle, and
wherein the vehicle transceiver is further configured to communicate the environmental data and the remote data server is further configured to receive the environmental data and formulate the different paint composition or formulate the different painting process based on the paint data, the ambient light data, and the environmental data.

11. The system of claim 7, wherein the paint sensor is further configured to detect the paint data periodically, and
wherein the paint data includes at least one of a paint color density, a paint integrity, a paint consistency, or a paint color.

12. The system of claim 7, wherein the paint sensor is further configured to detect the paint data when the ambient light data indicates an ambient light level within a particular range.

13. The system of claim 7, wherein the remote data server is further configured to formulate the different paint composition based on a current paint composition of the vehicle in addition to the paint data and the ambient light data.

* * * * *